(12) United States Patent
Gu et al.

(10) Patent No.: US 8,050,233 B2
(45) Date of Patent: Nov. 1, 2011

(54) METHOD AND APPARATUS OF SHIFTING FUNCTIONAL ENTITY IN WIMAX NETWORK

(75) Inventors: Liang Gu, Shenzhen (CN); Jianjun Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 539 days.

(21) Appl. No.: 12/335,005

(22) Filed: Dec. 15, 2008

(65) Prior Publication Data

US 2009/0092099 A1   Apr. 9, 2009

Related U.S. Application Data

(63) Continuation of application No. PCT/CN2007/070118, filed on Jun. 14, 2007.

(30) Foreign Application Priority Data

Jun. 14, 2006 (CN) .......................... 2006 1 0092207
Nov. 9, 2006 (CN) .......................... 2006 1 0138592

(51) Int. Cl.
H04L 12/24 (2006.01)
(52) U.S. Cl. ...................................... 370/331; 370/338
(58) Field of Classification Search .................. 370/331, 370/338
See application file for complete search history.

(56) References Cited

U.S. PATENT DOCUMENTS

| | | | |
|---|---|---|---|
| 6,732,177 B1 | 5/2004 | Roy | |
| 6,775,255 B1 | 8/2004 | Roy | |
| 6,859,448 B1 | 2/2005 | Roy | |
| 6,985,464 B2 | 1/2006 | Harper et al. | |
| 2003/0021252 A1 | 1/2003 | Harper et al. | |
| 2004/0103282 A1* | 5/2004 | Meier et al. | 713/171 |
| 2005/0088994 A1 | 4/2005 | Maenpaa et al. | |
| 2007/0258414 A1* | 11/2007 | Cheng et al. | 370/338 |

FOREIGN PATENT DOCUMENTS

| | | |
|---|---|---|
| CN | 1310554 | 8/2001 |
| CN | 1572120 | 1/2005 |
| WO | WO-0011885 | 3/2000 |
| WO | WO-03107600 | 12/2003 |

OTHER PUBLICATIONS

Written Opinion of the International Searching Authority regarding Application No. PCT/CN2007/070118, mailed Oct. 11, 2007. Translation provided by Huawei Technologies Co., Ltd.
WiMAX Forum Network Architecture (Stage 3: Detailed Protocols and Procedures). NWG Approved. Release 1, Version 1.3.0. Nov. 2, 2008, 692 pages.
International Search Report for International Application No. PCT/CN2007/070118, dated Sep. 11, 2007, and English translation thereof.

* cited by examiner

*Primary Examiner* — Melvin Marcelo
(74) *Attorney, Agent, or Firm* — Harness, Dickey & Pierce, P.L.C.

(57) ABSTRACT

A method and apparatus for shifting functional entity in WiMAX network is disclosed. A functional entity at the network side is set to be master functional entity or slave functional entity. The method includes: setting a binding relationship between a master functional entity and at least one slave functional entity; triggering the master functional entity to shift, combining a context of the slave functional entity bound with the master functional entity and a context of the master functional entity to form a context message that is required by the master functional entity for the shift, and forwarding the context message according to the course of shifting the master functional entity.

24 Claims, 5 Drawing Sheets

METHOD AND APPARATUS OF SHIFTING FUNCTIONAL ENTITY IN WIMAX NETWORK

CROSS-REFERENCE TO RELATED APPLICATIONS

This application is a continuation of International Application No. PCT/CN2007/070118, filed Jun. 14, 2007. This application claims the benefit and priority of Chinese Application No. 200610092207.1, filed Jun. 14, 2006, and Chinese Application No. 200610138592.9, filed Nov. 9, 2006. The entire disclosures of each of the above applications are incorporated herein by reference.

FIELD

The present disclosure relates to Worldwide Interoperability for Microware Access (WiMAX) network, and particularly, relates to a shifting method and apparatus of the functional entity in a WiMAX network.

BACKGROUND

This section provides background information related to the present disclosure which is not necessarily prior art.

The WiMAX network is a wireless metropolitan area network based on IEEE 802.16 standard, which, as shown in FIG. 1 consists of a user terminal, an access service network (ASN) and a connectivity service network (CSN). In WiMAX, a user terminal is a mobile station (MS)/subscriber station (SS); an ASN includes base station (BS) and access service network gateway (ASN GW); a CSN includes logic entities, such as a policy function (PF) server, an authentication, authorization, accounting (AAA) server, and an application function (AF) server.

The ASN provides a set of network function for wireless access service to the user terminal. The BS is configured to:

provide a level two (L2) connection between the BS and the user terminal;

provide functions such as management, measure and power control of wireless resource, and compression and encoding of air interface data.

The ASN-GW is configured to:

provide client functions such as authentication, authorization, accounting of the user terminal, which are performed by an Anchor Authenticator functional entity and an Anchor Accounting Client functional entity respectively;

support network discovery and selection of Network Service Provider, NSP;

provide Relay function of level three (L3) information, such as IP address allocation, to the user terminal; and manage wireless resource.

Besides the above-mentioned functions, the ASN-GW can also provide the following optional functions: ASN internal switch; paging and location management for the user terminal, such as a Paging Controller (PC) functional entity; tunnel management between ASN-GW that equals Foreign Agent (FA) in mobile IP (MIP) technique and Anchor PMIP Client) functional entity; Visitor Location registration, Anchor SFA functional entity.

Each of the above function corresponds to a functional entity in ASN-GW, for example, an Authenticator, a PMIP Client, an FA, a Paging Controller/Location Register (PC/LR), a Service Flow Authorization (SFA), a Data Pass Function (DPF), a Dynamic Host Configuration Protocol Proxy/Relay (DHCP Proxy/Relay), an Accounting Client, etc.

The functional entities in the above ASN-GW might have different timing for changing their triggering due to the functional entities that server individual user terminal move with the user terminals, resulting in the individual functional entity that serves particular user terminal might exist in different ASN-GWs. Thus, in the same service, the interaction between different ASN-GW's may occur, which would cause the implementing process of the service quite complex. For example, for an Accounting Client, since the user terminal moves, the accounting information will be transferred between multiple ASN-GW's. Then, except for the ASN-GW in which the Accounting Client acting as AAA Client is located is required to interact with AAA of accounting information, there also exists an interaction with ASN-GW in which the accounting agent that collects accounting information related to user service data process is located. However, the ASN-GW acting as the accounting agent that collects accounting information does not directly interact with the AAA server, but interacts with the ASN-GW in which the accounting client acting as AAA client is located.

Currently, there is no solution for shifting the ASN's functional entity in WiMAX network.

SUMMARY

This section provides a general summary of the disclosure, and is not a comprehensive disclosure of its full scope or all of its features.

Embodiments provide a method of shifting functional entities in a WiMAX network. According to the method, a functional entity at network side is set as master functional entity or slave functional entity.

The method further includes setting a binding relationship between a master functional entity and at least one slave functional entities; triggering a shift of the master functional entity, forming a context message required by the shift of the master functional entity from a context of the master functional entity and a context of the slave functional entity bound with the master functional entity, and transmitting the context message according to a process of the shift of the master functional entity.

Embodiments further provide an apparatus of shifting functional entity in WiMAX network. The apparatus includes:

a functional entity binding module, configured to store a binding relationship between a master functional entity and a slave functional entity in a WiMAX network;

a context message generating module, configured to generate a context message that includes a context of the master functional entity and a context of the slave functional entity bound with the master functional entity, in accordance with the binding relationship in the functional entity binding module, when the context message generating module is aware of a shift of the master functional entity being triggered; and a context message transmitting module, configured to transmit the context message generated by the context message generating module, in accordance with a process of the shift of the master functional entity.

It can be seen from the above solutions that by binding a master functional entity with a slave functional entity, when the shift of the master functional entity is triggered, context of the slave functional entity and context of the master functional entity will be shifted together, so as to reduce the complexity of system when an individual functional entity is shifted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
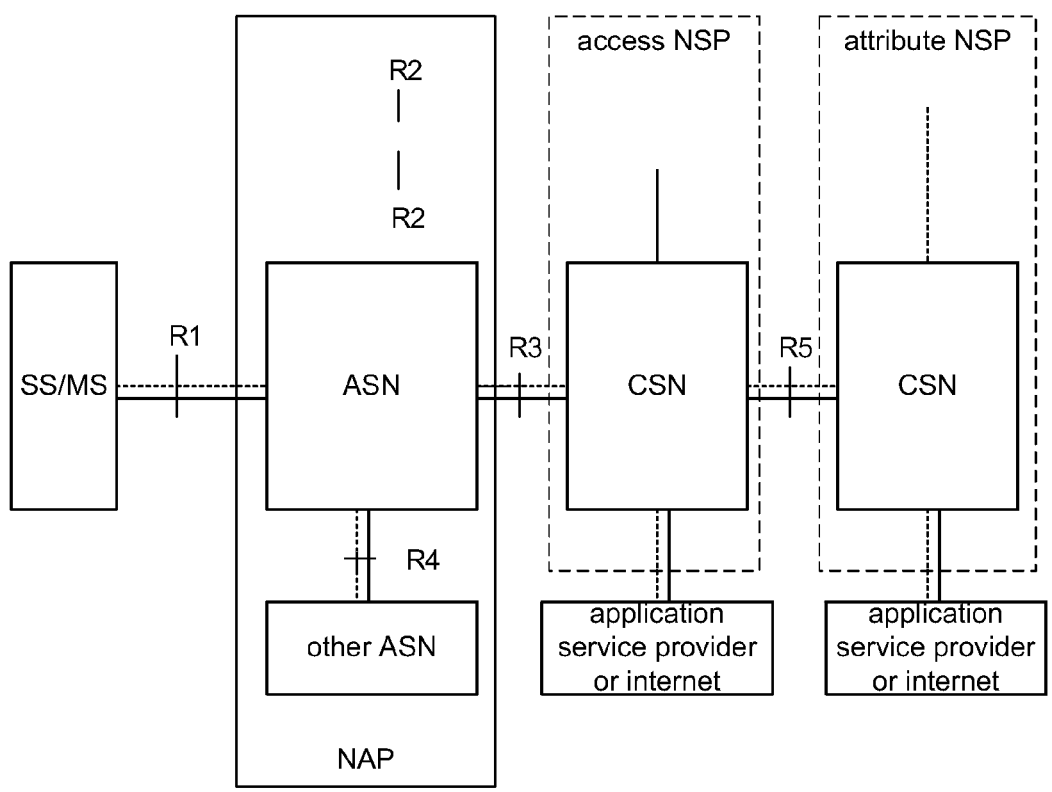
FIG. 1 is a schematic diagram of architecture of a WiMAX network.

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Embodiments provide a method of shifting a functional entity in WiMAX network. The functional entities of ASN are divided into two categories: one is master functional entity; the other is slave functional entity. Shifting of a functional entity includes basic steps as follows:

A binding relationship is established between functional entities; a master functional entity can be bound with at least one slave functional entity.

When the master functional entity shifts, the slave functional entity in binding relationship with the master functional entity shifts therewith.

In this case, the master functional entity can be Authenticator or Foreign Agent entity. The slave functional entity can include: Authenticator, Proxy mobile IP Client, Foreign Agent entity, Service Flow Authorization entity, Data Channel functional entity, Dynamic Host Configuration Protocol Proxy or Relay entity, Accounting Client, Accounting Client Agent.

In addition, in the idle mode, the slave functional entity further includes Paging Controller and Location Register (PC/LR), which can shift with the master functional entity or shift independently. It is worth noting that all of the above functional entities exist within each Access Service Network (ASN), when a user terminal accesses network, various functional entities serving the user terminal are all within a Serving ASN. Following shift of the user terminal, network resource optimization or other reasons, the shift of functional entities will occur. Herein, the shift means the shift of the functional entity that serves the user terminal, rather than the functional entity per se. Namely although each ASN has identical functional entity, it may not serve the user terminal at this time. The result of shift may result in the various functional entities that serve the user terminal being distributed in a plurality of ASN's.

In the embodiment, above-mentioned Accounting Client Agent may be called Anchor Accounting Client, which can be configured to collect accounting information. Accounting Client represents the AAA Client interacting with AAA of accounting information.

The embodiment provides a binding relationship between functional entities, and provides a method of shifting various functional entities based on the relationship, so as to decrease the complexity of system during shifting, in consideration to flexibility of the system and independency of the functional entities.

In the embodiment, the binding relationship is:

Service Flow Authorization entity, Data Channel functional entity, DHCP Proxy/Relay entity, Accounting Client Agent, as slave functional entities, are bound with Foreign Agent as master functional entity;

Proxy mobile IP Client, Accounting Client, as slave functional entities, are bound with Authenticator as master functional entity.

The binding relationships described above are only examples for explaining the solution of the disclosure, not for limiting the disclosure. There may be other binding relationships, for example:

Data Channel functional entity, DHCP Proxy/Relay entity, Accounting Client Agent, as slave functional entities, are bound with Foreign Agent as master functional entity;

Service Flow Authorization entity, Proxy mobile IP Client, Accounting Client, as slave functional entities, are bound with Authenticator as master functional entity.

In the idle mode, Paging Controller and Location Register (PC/LR) can shift along with the FA or Authenticator, or shift independently.

Reasons for shift of an FA include, but not limited to: movement of user terminal, and optimization of network resource. The specific procedure of shift of the FA resulting from the movement of the user terminal may occur incidentally in a switch procedure of the user terminal due to movement, specifically may show in the shift preparation procedure of the user terminal, i.e., when a service BS and a target BS negotiate whether a switch procedure can be performed, the switch procedure can be implemented through the ASN-GW to which the service BS connects and/or the target ASN-GW to which the target BS connects. To be specific, the target BS or target ASN-GW and the service BS or anchor ASN-GW determine whether shift the FA to local according to trust relationship with each other and local policy, at the same time that determine whether to allow an MS to switch to the target BS.

The specific procedure of shift of the FA resulting from the movement of user terminal can also show in a confirmation procedure of terminal switch. To be specific, the service BS receives a switch instruction message of terminal; after the target BS is clarified, the target BS or target ASN-GW and the service BS or anchor ASN-GW determine whether shift FA to local according to trust relationship with each other and local policy, after determining the MS to be switched to the target BS.

The specific procedure of shift of the FA resulting from the movement of user terminal can also show in a setting data channel procedure of terminal switch, in the procedure that the service ASN-GW to be shifted to, i.e., target ASN-GW, sets an R4 channel to the ASN-GW (anchor ASN-GW) in which the FA originally is located, the target ASN-GW or anchor ASN-GW determines to shift FA to the target ASN-GW.

Reasons for the shift of an Authenticator include, but not limited to: re-authenticate (possible reasons thereof involve key expire, or change of authenticating domain etc.).

In this embodiment, context information required to be transmitted when FA shifts and associated with a specific user terminal includes one or more of the following items or sub-items:

1. context related to authentication and authorization: Authenticator ID, key context information that relates to mobile IP register;

2. context maintained by DHCP Relay entity: address list of DHCP Server;

3. context maintained by DHCP Proxy entity: IP address and corresponding lifetime and timer;

4. context maintained by DPF entity: head compress parameter, service classifier information, configuration information of data carrying channel;

5. context maintained by SFA entity: preset flow parameter set, user contract information, QoS parameter set of dynamic service flow, mapping and maintain information of FID and SFID of service flow;

6. context maintained by Accounting Client: Acc-Multi-Session-ID, prepaid quota;

7. MIP capability information: IPv4 or IPv6, whether it is SIP or Proxy Mobile IP (PMIP) or Client Mobile IP (CMIP) at present, whether multiple IP address capability is supported, whether multiple MIP register service is supported, whether reverse tunnel service is supported, whether route optimization service is supported;

8. In the idle mode

If the PC/LR shifts with the FA entity, i.e., bound with the FA entity, then context maintained by the PC/LR shall be transmitted when shifting: Paging Group ID (PGID), Paging Cycle, Paging Offset, Paging duration;

If the PC/LR does not shift with the FA entity, then context related to paging shall be transmitted when shifting: Anchor Paging Controller Identifier (Anchor PC ID).

In this embodiment, context information required to be transmitted when shifting and associated with a specific user terminal includes one or more of the following items or sub-items:

1. Foreign Agent ID (FA ID), Anchor Data Channel Functional Entity Identifier (Anchor DPF ID), Mobile Node and Foreign Agent Key (MN-FA-KEY), Mobile Node and Home Agent Key (MN-HA-KEY), Foreign Agent and Home Agent Key (FA-HA-KEY), Root key that generates Mobile Node MIP related key (MIP-RK), Root key that generates Foreign Agent related key (FA-RK), service related Master Session Key (MSK), service related Pair Master Key (PMK).

2. Under PMIP working mode, lifetime of the keys as described in 1, context maintained by Proxy Mobile IP Client (PMIP Client) are further included: Register information of MIP, including Home-of Address (HoA) of MS, Care of Address (CoA), lifetime of MIP register; IP address of Home Agent (HA) and Network Access Identifier (NAI) and/or IP address of Foreign Agent;

3. In the idle mode

If the PC/LR shifts with the Authenticator, then context maintained by the PC/LR shall be transmitted when shifting: Paging Group Identifier (PGID), Paging Cycle, Paging Offset, Paging duration;

If the PC/LR does not shift with the Authenticator, then context related to paging shall be transmitted when shifting: Anchor Paging Controller Identifier (Anchor PC ID).

Embodiment 1

Figure 2:
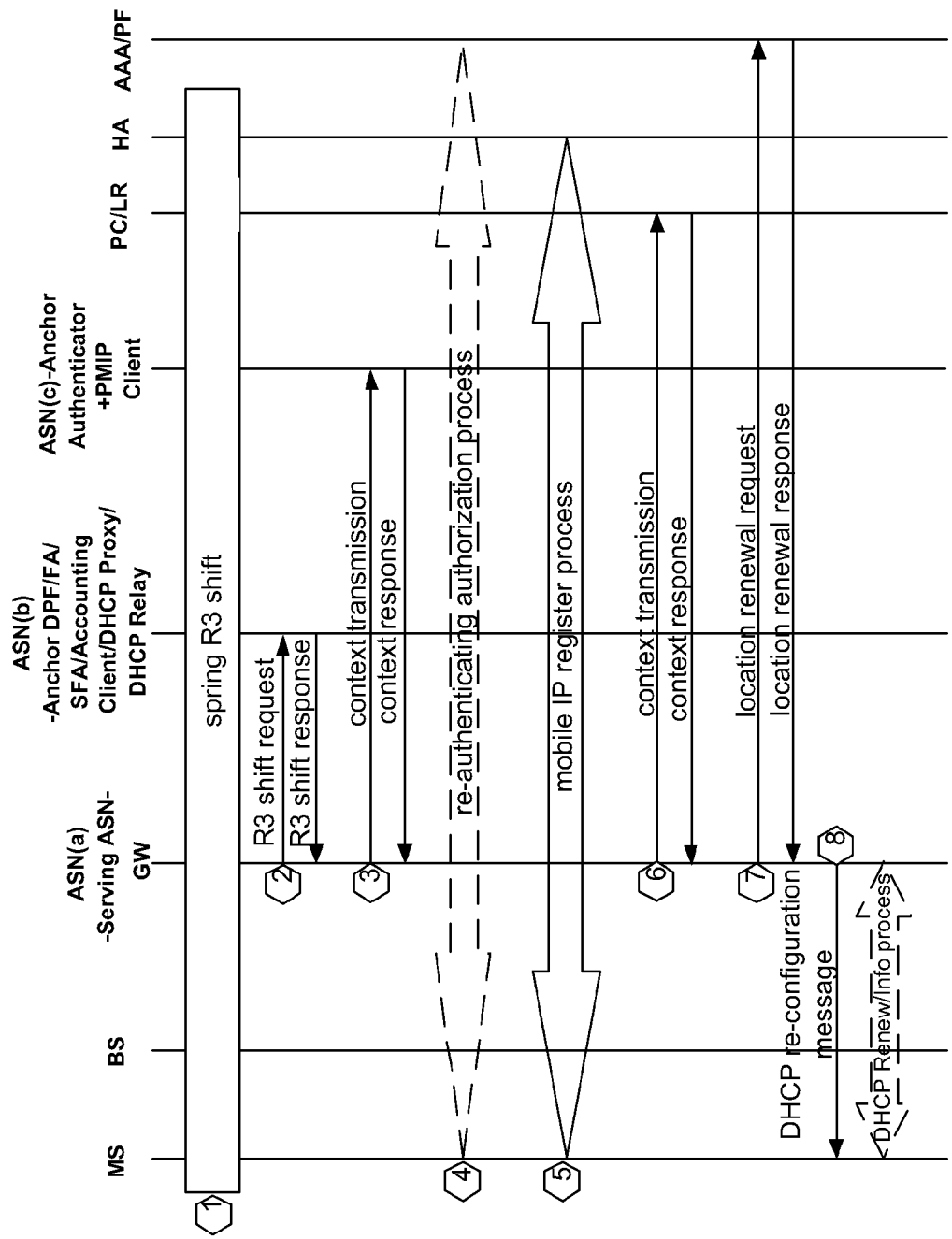
FIG. 2 is a flow chart according to embodiment one.

As shown in FIG. 2, when a Foreign Agent Entity shift is triggered, following steps are included:

Step 1: An FA entity shift is triggered; the reasons for the triggering were discussed above so that they are omitted for brevity;

Step 2: A Serving Access Service Network Gateway (Serving ASN-GW) of the user terminal requests, from an Anchor Access Service Network Gateway (Anchor ASN-GW) in which the FA entity is located the context information required to be carried when the FA entity shifts; the Serving ASN-GW is the Access Network Gateway to which the FA shifts, and may be called a target access network gateway.

The Anchor ASN-GW informs the Serving ASN-GW about the context information required to be carried when the FA entity shifts.

Step 2 in the embodiment can also be:

The Anchor ASN-GW in which the FA entity is located informs the Serving ASN-GW of the user terminal bout the context information required to be carried when FA entity shifts.

Step 2 in the embodiment can also be:

For the case of PMIP, the Anchor ASN-GW in which FA entity is located sends an R3 shift request message from the ASN-GW of the user terminal in which the Anchor PMIP Client entity is located, requiring the shift of the FA entity to current Serving ASN-GW of the user terminal.

After the receipt of the R3 shift request sent by the current Serving ASN-GW of the user terminal, the ASN-GW of the user terminal in which the Anchor PMIP Client is located finds MIP register context of the user terminal, packages a complete MIP register request message, and sends to the current Serving ASN-GW of the user terminal; the Serving ASN-GW forwards to the HA of the user terminal.

Step 2 in the embodiment can also be:

For the case of PMIP, Serving ASN-GW of the user terminal directly sends an R3 shift request message to an ASN-GW of the terminal in which the Anchor PMIP Client entity is located, requesting to shift FA to current Serving ASN-GW of MS;

After the ASN-GW of the user terminal in which Anchor Proxy mobile IP Client is located receives the R3 shift request sent by the current Serving ASN-GW of the user terminal, it finds MIP register context of the user terminal, packages complete MIP register request message, and send to current Serving ASN-GW of the user terminal as a response; the Serving ASN-GW forwards to Home Agent of the user terminal;

For the case of CMIP, an FA entity in Serving ASN-GW of the user terminal directly sends an Agent Broadcast message to the user terminal, and the user terminal initiates a MIP register procedure upon receipt of the message.

In this embodiment, the following steps may be further included:

Step 3: After the Serving ASN-GW receives the R3 shift response message, a context transmission message is sent to the ASN-GW in which Anchor Authenticator is located; in which the context transmission message at least carries address information of FA entity after shift, delivery address CoA information of Mobile IP and indication message about whether to re-authenticate;

If re-authentication is needed, the re-authenticating indication is also used for informing Anchor Authenticator and Proxy mobile IP Client (PMIP Client) to stop current authentication and MIP related signaling process. The ASN-GW in which the Anchor Authenticator is located, upon receipt of the context transmission message, sends a context response message to the Serving ASN-GW; in which the context response message carries context information that relates to Authenticator shift. Step 3 is an optional step.

If re-authentication is required in Step 3, the re-authenticating authorization process initiates (See Step 4). In this step, the re-authenticating process may be initiated by the Anchor Authenticator triggering the user terminal; also may be initiated by the Authenticator in the Serving ASN-GW triggering the user terminal.

Step 4 is an optional step, and the concrete authenticating process and message are clearly defined in the prior art, so no further explanation is provided herein.

In the embodiment, when the context information carried in the R3 shift response message involves the user terminal desiring to use Mobile IP Service information, in which the MIP service information is included in MIP capability information in the context information, a process of initiating mobile IP register is further included, as shown in Step 5 in FIG. 2. This step is an optional step, in which the specific signaling of the mobile IP register process may refer to RFC3344.

Further, supported modes according to mobile IP can be classified into two scenarios:

In Proxy mobile IP mode, Proxy mobile IP Client initiates a process of mobile IP register according to the shifted FA entity and delivery address CoA information.

In User Terminal Mobile IP mode, the shifted FA entity sends an Agent Broadcast message to the user terminal, which carries shifted delivery address CoA information; the user terminal, upon receipt of the Agent Broadcast message, initiates a process of mobile IP register.

As shown in Step 7 in FIG. 2, after the FA entity completes the shift, a SFA entity bound therewith sends a location renewal request message to Policy Function (PF) entity, inform the PF entity of shifted Anchor SFA identifier, this step is optional.

As shown in Step 6 in FIG. 2, in idle mode, after the FA completes the shift, Serving ASN-GW sends a context transmission message to Anchor PC/LR, which carries shifted FA entity and DPF entity address information; the Anchor PC/LR, upon receipt of the context transmission message, sends a context response message to Serving ASN-GW, this step is optional.

As shown in Step 8 in FIG. 2, after the FA entity completes the shift, DHCP Proxy entity bound therewith sends a DHCP re-configuration message to MS, informing the user terminal of shifted address of DHCP Proxy entity or informing the user terminal to re-initiate a DHCP address renewal or configuration message acquisition process to obtain shifted address of DHCP Proxy entity, this step only appears in the case that IP address of the user terminal is assigned by DHCP Proxy entity.

Embodiment 2

Figure 3:
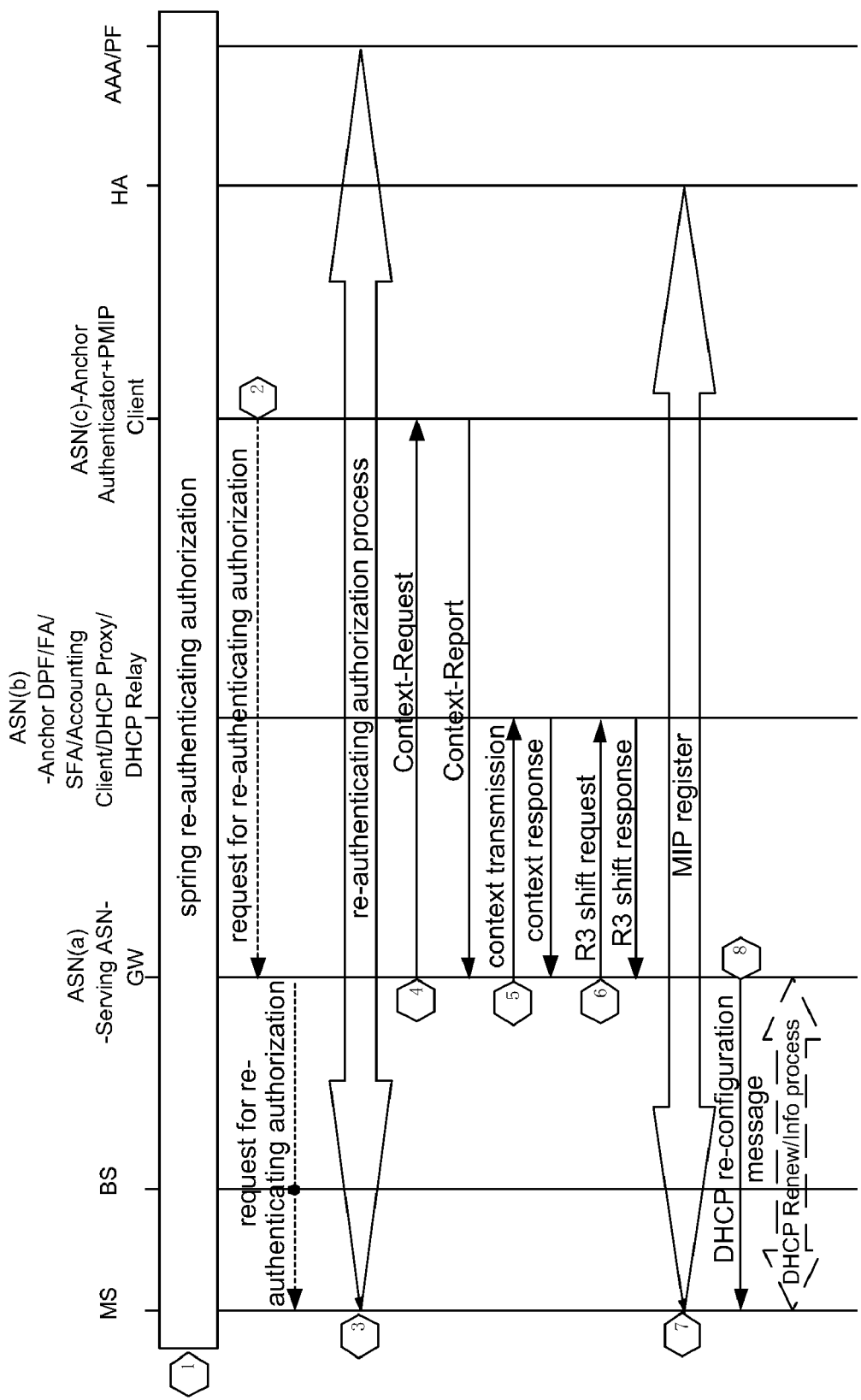
FIG. 3 is a flow chart according to embodiment two.

As shown in FIG. 3, when Authenticator shifts, following steps are included:

Step 1: A process of re-authenticating, authorizing is triggered, and the process includes a scenario of triggering of a user terminal or network.

Step 2: If the re-authenticating is triggered at the network side, it can be triggered by Anchor Authenticator, or can be triggered by the Service Access Network Gateway, and the base station is eventually informed to inform user terminal via an air interface to trigger the process of re-authenticating, said step 2 is optional;

Step 3: The process of re-authenticating and authorizing is executed, and the specific signaling thereof is defined in IEEE 802.16d/e and WiMAX draft, so that it is omitted for brevity.

Step 4: A Service ASN-GW sends a Context-Requests message to the Access Service Network Gateway in which an Anchor Authenticator entity is located before shift. The Access Service Network Gateway in which Anchor Authenticator entity is located can refer to as Anchor Access Service Network Gateway, and the Service ASN-GW can refer to as target access network gateway.

After the access service network gateway receives the Context-Request message, a Context-Report message is sent to Service ASN-GW. The Context-Report message carries context information in relationship to shift of Authenticator.

When the FA entity does not require a shift, then a step 5 is included; if FA entity requires a shift, then a step 6 is included.

Step 5: Service ASN-GW or the ASN-GW in which Anchor Authenticator entity is located before shift informs the Anchor ASN-GW in which Foreign Agent entity is located of a new Authenticator identifier and/or an identifier of ASN-GW in which the new Authenticator is located;

Service ASN-GW sends a context transmission message to the Anchor ASN-GW in which Foreign Agent entity is located, the context transmission message carries IP address, host configuration information, preset flow information, prepay quota and mobile IP related capacity and security information;

After the Anchor ASN-GW receives the context transmission message, a context response message will be sent to Service ASN-GW.

Step 6: Service ASN-GW sends an R3 shift request message to the Anchor ASN-GW in which FA entity is located, wherein this message carries an instruction for the FA shift;

After the Anchor ASN-GW receives the R3 shift request message, an R3 shift response message will be sent to Service ASN-GW. The R3 shift response message carries contexts needed to be carried when FA entity shifts.

In the embodiment, after step 6, a step 7 may be involved: trigger a process of mobile IP register, and the specific signaling may refer to RFC3344, which is omitted here for brevity. It may be divided into two cases according to support modes of MIP:

When it is proxy mobile IP mode, the procedure for triggering mobile IP register is: proxy mobile IP client of Service ASN-GW triggers a mobile IP register according to Service ASN-GW by shifted FA entity and delivery address CoA information provided by internal primitive.

When it is user terminal mobile IP mode, the procedure for triggering a mobile IP register includes:

Shifted FA entity sends an agent broadcast message to user terminal, which carries shifted delivery address CoA information;

After the user terminal receives the agent broadcast message, a process for mobile IP register is triggered.

In the embodiment, after step 6, a step 8 can be included: DHCP Proxy entity bound therewith sends a DHCP re-configuration message to MS, informs MS of address of shifted DHCP Proxy entity or informs MS to re-trigger DHCP address renewal or configuration message acquisition process to obtain address of shifted DHCP Proxy entity. This step only appears in the case where IP address of MS is distributed by DHCP Proxy entity.

In addition, in the embodiment, in idle mode, when the paging controller and location register does not bind with Foreign Agent entity, following steps may be included:

The Service ASN-GW sends a context transmission message to Anchor PC/RL, which carries shifted information of Authenticator and DPF entity address;

After the Anchor PC/RL receives the context transmission message, a context response message will be sent to Service ASN-GW.

Embodiment 3

Figure 4:
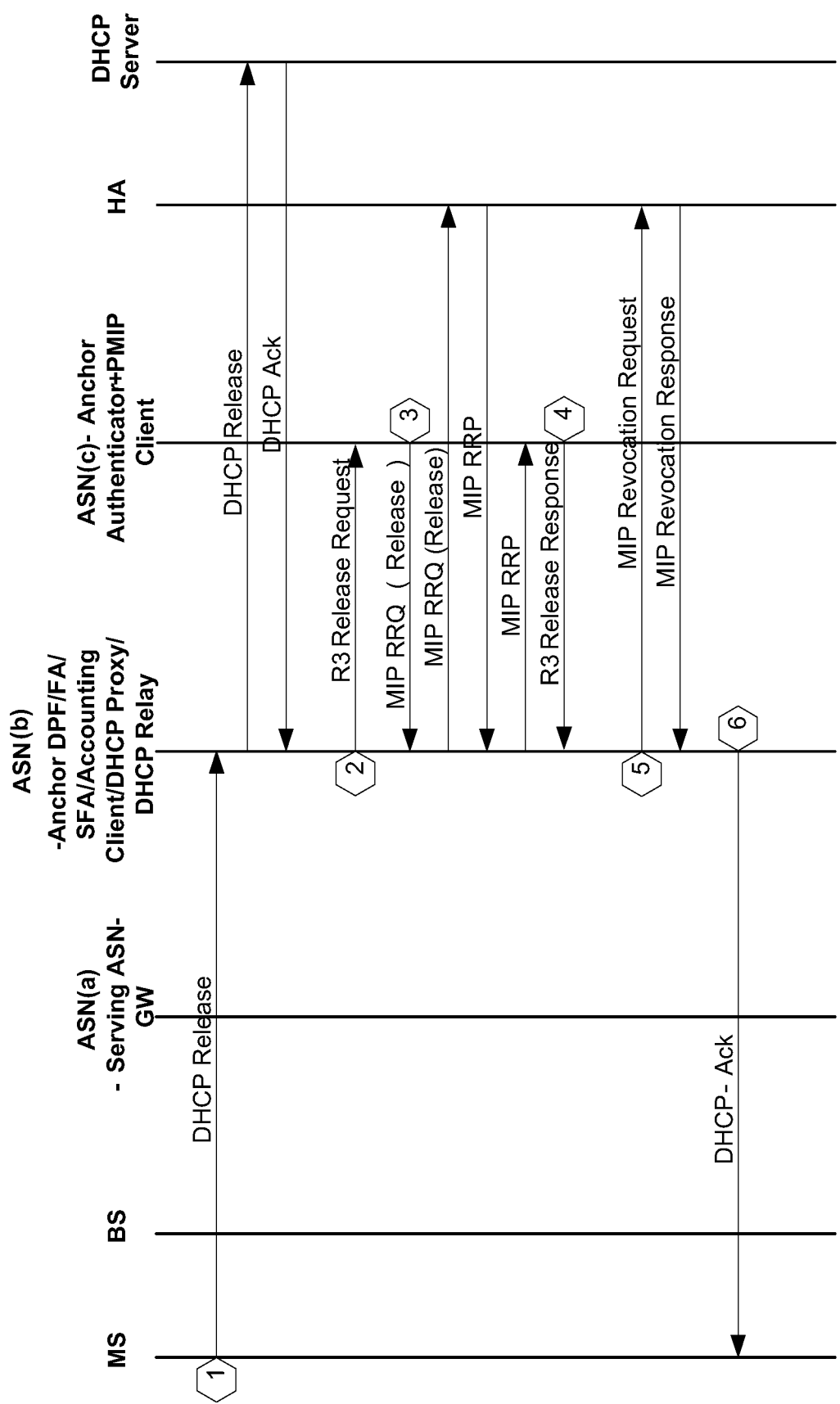
FIG. 4 is a flow chart according to embodiment three.

As shown in FIG. 4, in the embodiment of shift of the above functional entity, release of IP address includes as follows:

Step 1: A user terminal sends an IP address release (DHCP Release) message to the ASN-GW in which dynamic host configuration protocol agent or Relay (DHCP Proxy/Relay) entity is located.

Step 6: The ASN-GW in which dynamic host configuration protocol agent or relay entity is located sends an IP address release acknowledge (DHCP-Ack) message to the user terminal.

When a dynamic host configuration protocol server is located in connection service network, the following steps can be included:

The ASN-GW in which dynamic host configuration protocol relay (DHCP Relay) entity is located receives the IP address release message, the IP address release message will be sent to dynamic host configuration protocol server (DHCP Server).

After the dynamic host configuration protocol server receives the IP address release message, an IP address release acknowledge (DHCP Ack) message will be sent to the ASN-GW in which dynamic host configuration protocol relay entity is located.

In the embodiment, in proxy mobile IP mode, it can includes:

Step 2: After the ASN-GW in which dynamic host configuration protocol agent or relay entity is located receives the IP address release request message, the dynamic host configuration protocol agent or relay entity sends an R3 Release Request message to the ASN-GW in which proxy mobile IP client is located, in order to trigger mobile IP to register.

Step 3: After the ASN-GW in which proxy mobile IP client (PMIP Client) is located receives the release request message, a mobile IP release-register (MIP RRQ(Release)) message is sent to the FA entity;

After the FA entity receives the release-register message, the message will be sent to home agent HA entity;

After the HA entity the release-register message, the mobile IP release-register is performed, then a mobile IP release-register response (MIP RRP) message will be sent to the FA entity;

Step 4: The FA entity sends the release-register response message to proxy mobile IP client.

In the embodiment, in user terminal mobile IP mode, FA, in place of the terminal, completes mobile IP release-register. After step 1, it can include:

Step 5, The FA entity sends a mobile IP revocation request (MIP Revocation Request) message to the HA entity.

After the HA entity completes the release-register of the user terminal, a MIP Revocation Response message will be sent to the ASN-GW in which the dynamic host configuration protocol agent or relay entity is located.

Embodiment 4

Figure 5:
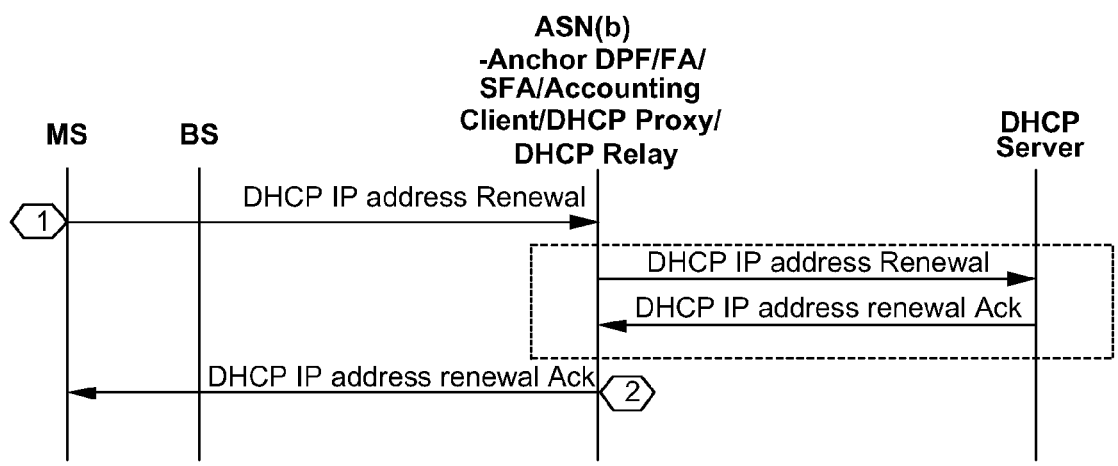
FIG. 5 is a flow chart according to embodiment four.

As shown in FIG. 5, in the embodiment of shift of the above functional entity, renewal of IP address includes as follows:

Step 1: A user terminal sends an IP address renewal (DHCP Renewal) message to the ASN-GW in which dynamic host configuration protocol agent or Relay (DHCP Proxy/Relay) entity is located.

Step 2: The ASN-GW in which dynamic host configuration protocol agent or relay entity is located sends an IP address renewal acknowledge (DHCP-Ack) message to the user terminal.

When a dynamic host configuration protocol server is located in connection service network, the following steps can be included:

The ASN-GW in which dynamic host configuration protocol relay (DHCP Relay) entity is located receives the IP address renewal message, the IP address renewal message will be sent to dynamic host configuration protocol server (DHCP Server);

After the dynamic host configuration protocol server receives the IP address renewal message, an IP address renewal acknowledge (DHCP Ack) message will be sent to the ASN-GW in which dynamic host configuration protocol relay entity is located.

When DHCP Proxy is used to configure the IP address of the terminal, the following steps may be included:

After the ASN-GW in which DHCP Proxy entity is located receives the IP address renewal message, regardless of whether the target address in IP message header of the IP address renewal message is the address of dynamic host configuration protocol agent entity after shift, the message will be filtered, and the message will be processed and replied according to the context maintained by the dynamic host configuration protocol agent entity.

In above embodiments, different functional entities can exist in different physical entities or in a same physical entity. When they are in the same physical entity, the interaction therebetween is internal primitive.

The embodiments provide a shifting apparatus of the functional entity in WiMAX network, the apparatus includes:

a functional entity binding module, configured to store a binding relationship between master functional entities and slave functional entities in WiMAX network;

a context message generating module, configured to generate a context message that includes a context of a master functional entity and a context of the slave functional entity bound with the master functional entity, in accordance with the binding relationship in the functional entity binding module, when it knows that a shift of the master functional entity is triggered;

a context message transmitting module, configured to transmit the context message generated by the context message generating module, in accordance with the process of shift of the master functional entity.

The apparatus can further include: a bind setting module, configured to set the binding relationship in the functional entity binding module.

The binding relationship set by the bind setting module is any one of the following binding relationships or the combination thereof:

Data Channel functional entity, DHCP Proxy/Relay entity, and Accounting Client Agent, as slave functional entities, are bound with Foreign Agent entity as master functional entity;

Service Flow Authorization entity, Accounting Client, and/or Proxy mobile IP Client, as slave functional entities, are bound with Authenticator as master functional entity.

The context message generating module can further include a context acquisition module, configured to obtain the contexts maintained by Authenticator, Proxy Mobile IP Client, Foreign Agent entity, Service Flow Authorization entity, Data Channel functional entity, DHCP Proxy/Relay entity, Accounting Client and/or Accounting Client Agent.

The apparatus further includes: an IP address release and renewal module, configured to release IP address of a master functional entity before shift, and renew current IP address of the master functional entity, after the completion of the shift of the master functional entity.

The above-mentioned apparatus may be provided in an ASN-GW and/or a base station.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of shifting a functional entity in a WiMAX network, comprising setting a functional entity at network side as master functional entity or slave functional entity, wherein the method further comprises:
    establishing a binding relationship between a master functional entity and at least one slave functional entities;
    triggering a shift of the master functional entity, forming a context message that is required by the shift of the master functional entity from a context of the master functional entity and a context of the slave functional entity bound with the master functional entity, and transmitting the context message according to a process of the shift of the master functional entity.

2. The method of claim 1, wherein the master functional entity is an authenticator and/or a foreign agent entity.

3. The method of claim 1, wherein the slave functional entity comprises: an authenticator, a proxy mobile IP client, a foreign agent entity, a service flow authorization entity, a data channel functional entity, a dynamic host configuration protocol proxy or relay entity, an accounting client, and/or an accounting client agent.

4. The method of claim 3, wherein the binding relationship is:
    binding a foreign agent, which functions as a master functional entity with one of the following or a combination thereof, which functions as a slave functional entity: a data channel functional entity, a service flow authorization entity, a proxy mobile IP client, a DHCP proxy/relay entity, an accounting client agent; and/or
    binding an authenticator, which functions as a master functional entity with one of the following or a combination thereof, which functions as a slave functional entity: a service flow authorization entity, an accounting client and/or a proxy mobile IP client.

5. The method of claim 2, wherein the slave functional entity bound with the authenticator or the foreign agent entity further comprises a paging controller and location register in the idle mode.

6. The method of claim 5, wherein context of the paging controller and location register comprises a paging group identifier, a paging cycle, a paging offset, and/or a paging duration.

7. The method of claim 3, wherein the context message comprises one or any one of combinations of:
    context of DHCP relay entity, including an address list of DHCP server;
    context of DHCP proxy entity, including one or more of an IP address, a corresponding lifetime and a timer;
    context of DPF entity, including one or more of a head compress parameter, service classifier information and configuration information of a data carrying channel;
    context of SFA entity, including a preset flow parameter set, user contract information, a QoS parameter set of dynamic service flow, mapping and maintain information of FID and SFID of service flow, or a combination thereof;
    context of accounting client entity, including Acc-Multi-Session-ID and/or a prepaid quota; and
    MIP capability information, including being IPv4 or IPv6, being SIP or proxy mobile IP or client mobile IP at present, supporting multiple IP address capability or not, supporting multiple MIP register service or not, supporting reverse tunnel service or not, supporting route optimization service or not, or any combination thereof.

8. The method of claim 4, wherein the master functional entity is an authenticator, and the context message further comprises one of the following or a combination thereof:
    a foreign agent ID, an anchor data channel functional entity identifier, a key of a mobile node and a foreign agent, a key of a mobile node and a home agent, a key of a foreign agent and a home agent, a root key that generates a mobile node MIP related key, a root key that generates a foreign agent related key, a service related master session key, a service related pair master key.

9. The method of claim 8, wherein the context message further comprises lifetime of the respective keys.

10. The method of claim 8, wherein the context message further comprises one or any one of combinations of:
    context of a proxy mobile IP client, including register information of MIP, which includes Home-of Address of MS, a care of address, lifetime of MIP register;
    IP address of home agent and a network access identifier; and
    IP address of foreign agent.

11. The method of claim 1, further comprising releasing or renewing IP address of user terminal.

12. The method of claim 11, wherein the release of IP address of user terminal in proxy mobile IP mode comprises:
    sending a mobile IP release request to the ASN-GW in which proxy mobile IP client is located, after the dynamic host configuration protocol agent or relay entity receives the IP address release request;
    sending, by the ASN-GW in which proxy mobile IP client is located, a mobile IP release-register request to the foreign agent entity;
    sending, by the foreign agent entity, the mobile IP release-register request to home agent entity;
    performing, by the home agent entity, mobile IP release-register and sending a release-register response to the foreign agent entity;
    sending, by the foreign agent entity, the release-register response to proxy mobile IP client;
    sending, by the ASN-GW in which the proxy mobile IP client is located, a release response to the ASN-GW in which the dynamic host configuration protocol agent or relay entity is located; and
    releasing, by the dynamic host configuration protocol agent or relay entity, IP address of the terminal.

13. The method of claim 11, wherein the renewal of IP address of user terminal comprises:
    sending, by the user terminal, an IP address renewal message to the ASN-GW in which dynamic host configuration protocol agent or relay entity is located;

sending, by the ASN-GW in which dynamic host configuration protocol agent or relay entity is located, an IP address renewal acknowledge message to the user terminal.

14. The method of claim 1, wherein if a foreign agent entity is used as the master functional entity, the shift of the foreign agent entity comprises:
   requesting, by a target ASN-GW of the user terminal, from the anchor ASN-GW in which the foreign agent entity is located before shift, context information needed to be carried when the foreign agent entity shifts;
   informing, by the anchor ASN-GW before the shift, the target ASN-GW of the user terminal of the context information needed to be carried when the foreign agent entity shifts.

15. The method of claim 1, wherein if a foreign agent entity is used as the master functional entity, the shift of the foreign agent entity comprises:
   informing, by the anchor ASN-GW in which the foreign agent entity is located, the target ASN-GW of the user terminal of context information needed to be carried when the foreign agent entity shifts.

16. The method of claim 1, wherein if proxy mobile IP is utilized and a foreign agent entity is used as the master functional entity, the shift of the foreign agent entity comprises:
   sending, by the anchor ASN-GW in which the foreign agent entity is located before shift, an R3 shift request to the ASN-GW of the user terminal in which the proxy mobile IP client entity is located, requesting to shift foreign agent entity to the target ASN-GW of the user terminal;
   finding, by the ASN-GW in which the anchor proxy mobile IP client of the user terminal is located, the mobile IP register context of the user terminal, packing a complete mobile IP register request message, and sending to a target ASN-GW of the user terminal; and
   forwarding, by the target ASN-GW, the mobile IP register request message to home agent of the user terminal.

17. The method of claim 1, wherein if proxy mobile IP is utilized and a foreign agent entity is used as the master functional entity, the shift of the foreign agent entity comprises:
   sending, by a target ASN-GW of the user terminal, directly, an R3 shift request message to the ASN-GW in which the anchor proxy mobile IP client entity of the terminal is located, requesting to shift a foreign agent entity to the target ASN-GW of the user terminal;
   finding, by the ASN-GW in which the anchor proxy mobile IP client of the user terminal is located, a mobile IP register context of the user terminal, packaging a complete mobile IP register request message, and sending as a response to the target ASN-GW of the user terminal; and
   forwarding, by the target ASN-GW, the mobile IP register request message to home agent of the user terminal.

18. The method of claim 1, wherein if an authenticator is used as the master functional entity, the shift of the authenticator comprises:
   initiating, by the user terminal, a re-authenticating authorization process;
   requesting, by a target ASN-GW, context information related to shift of the authenticator from the ASN-GW in which the authenticator is located before the shift; and
   informing, by the ASN-GW in which the authenticator is located before the shift, the target ASN-GW of the context information related to the shift of the authenticator.

19. The method of claim 1, wherein if an authenticator is used as the master functional entity, the shift of the authenticator comprises: informing, by the ASN-GW in which the authenticator is located before the shift, a target ASN-GW of context information related to the shift of the authenticator directly.

20. An apparatus of shifting functional entity in WiMAX network, comprising:
   a functional entity binding module, configured to store a binding relationship between a master functional entity and a slave functional entity in a WiMAX network;
   a context message generating module, configured to generate a context message that includes a context of the master functional entity and a context of the slave functional entity bound with the master functional entity, in accordance with the binding relationship in the functional entity binding module, when the context message generating module is aware of a shift of the master functional entity being triggered; and
   a context message transmitting module, configured to transmit the context message generated by the context message generating module, in accordance with a process of shift of the master functional entity.

21. The apparatus of claim 20, further comprising: a bind setting module, configured to set the binding relationship in the functional entity binding module.

22. The apparatus of claim 21, wherein the binding relationship set by the bind setting module is any one of the following or a combination thereof:
   binding a foreign agent, which functions as a master functional entity with one of the following or a combination thereof, which functions as a slave functional entity: a data channel functional entity, a service flow authorization entity, a proxy mobile IP client, a DHCP proxy/relay entity, an accounting client agent; and/or
   binding an authenticator, which functions as a master functional entity with one of the following or a combination thereof, which functions as a slave functional entity: a service flow authorization entity, an accounting client and/or a proxy mobile IP client.

23. The apparatus of claim 20, wherein the context message generating module further comprises: a context acquisition unit, configured to obtain contexts maintained by an authenticator, a proxy mobile IP client, a foreign agent entity, a service flow authorization entity, a data channel functional entity, a dynamic host configuration protocol proxy/relay entity, an accounting client and/or an accounting client agent.

24. The apparatus of claim 20, further comprising: an IP address release and renewal module, configured to release IP address of user terminal, and renew current IP address of user terminal.

* * * * *